July 5, 1938. J. HANSEN 2,123,041
METHOD OF MANUFACTURING ELECTRIC CONNECTERS
Filed May 9, 1936 4 Sheets-Sheet 1
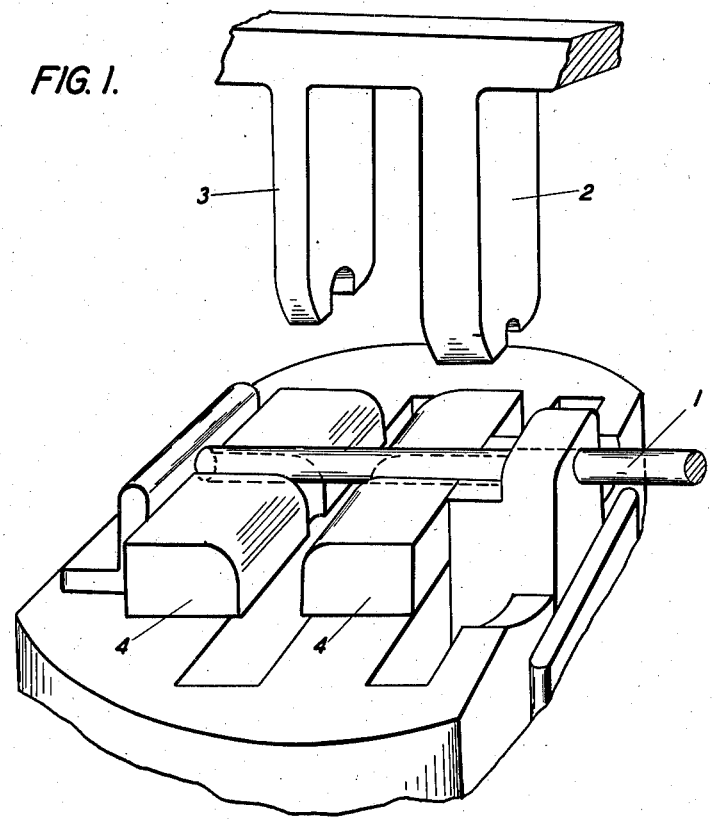
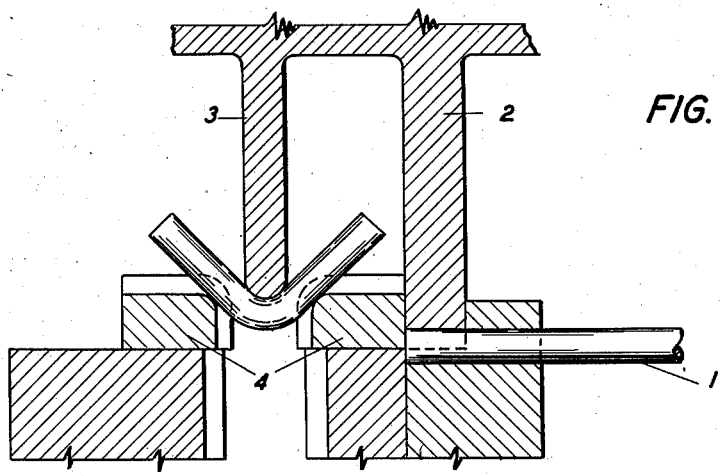
INVENTOR.
Jasper Hansen
BY Harry Lea Dodson
ATTORNEY.

July 5, 1938.   J. HANSEN   2,123,041
METHOD OF MANUFACTURING ELECTRIC CONNECTERS
Filed May 9, 1936   4 Sheets-Sheet 2

INVENTOR.
Jasper Hansen
BY Harry Lea Dodson
ATTORNEY.

July 5, 1938.  J. HANSEN  2,123,041
METHOD OF MANUFACTURING ELECTRIC CONNECTERS
Filed May 9, 1936    4 Sheets-Sheet 3
FIG. 6.
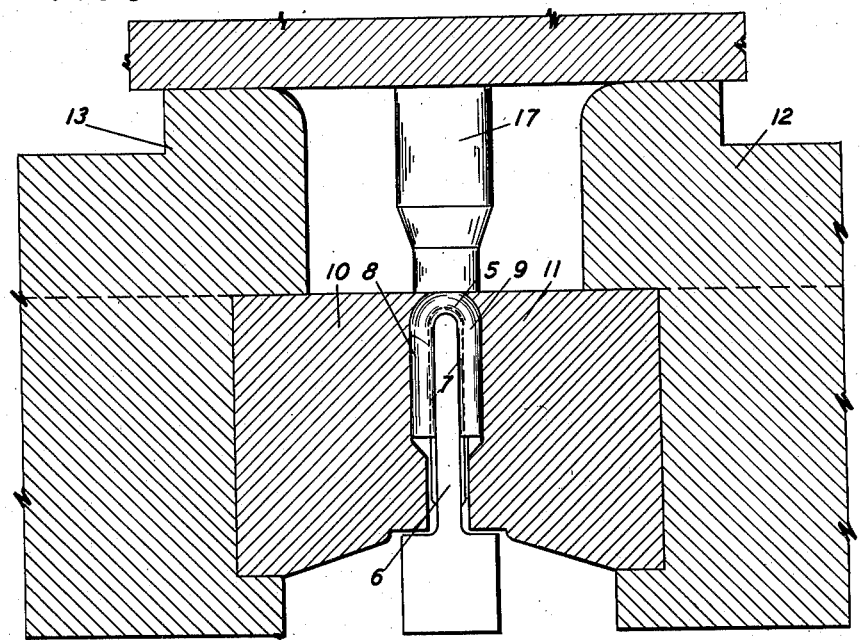
FIG. 7.
FIG. 8.
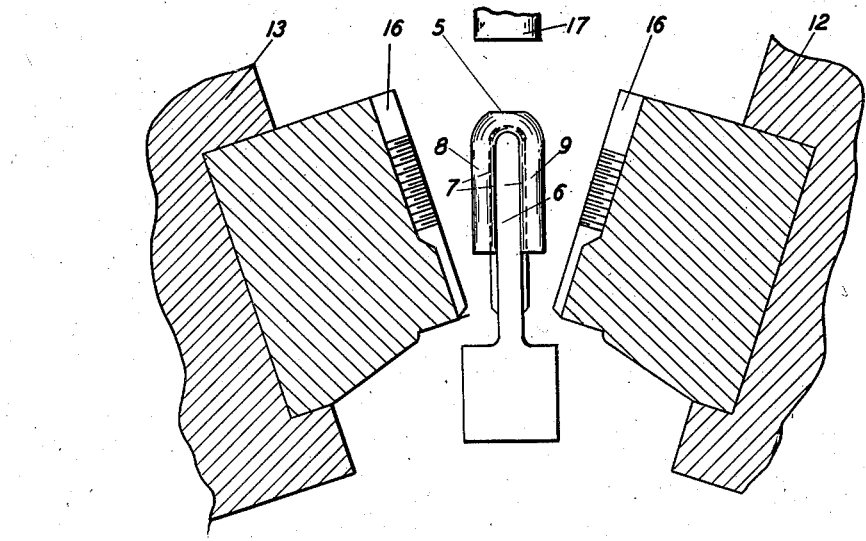
FIG. 9.
INVENTOR.
Jasper Hansen
BY Harry Lea Dodson
ATTORNEY.

July 5, 1938.  J. HANSEN  2,123,041
METHOD OF MANUFACTURING ELECTRIC CONNECTERS
Filed May 9, 1936 4 Sheets-Sheet 4
FIG. 10.
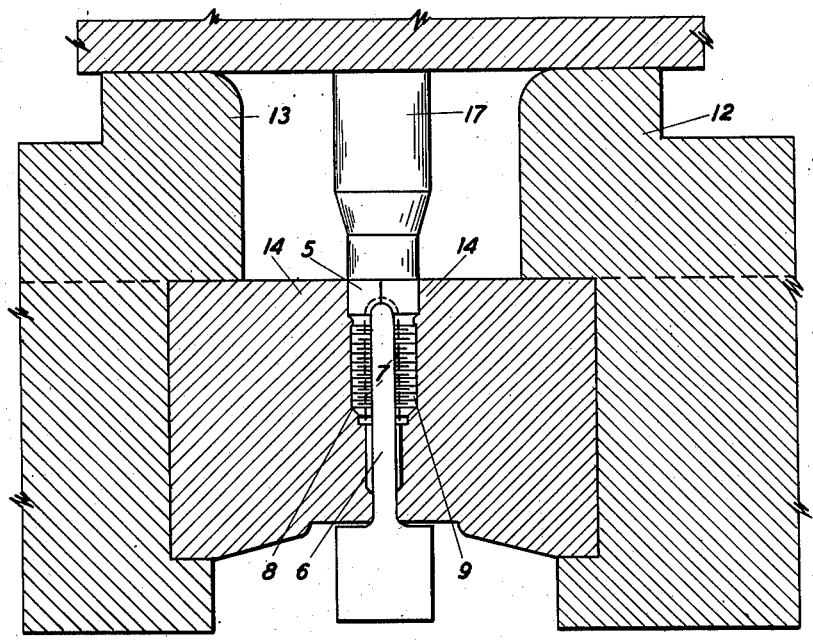
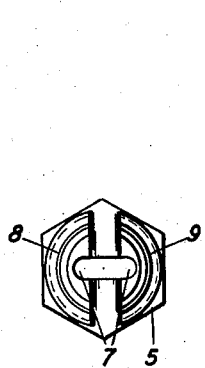
FIG. 11.
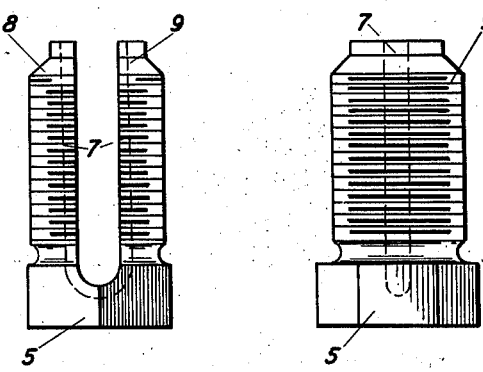
FIG. 12.
FIG. 13.
INVENTOR.
Jasper Hansen
BY Harry Lea Dodson
ATTORNEY.

Patented July 5, 1938

2,123,041

UNITED STATES PATENT OFFICE 2,123,041

METHOD OF MANUFACTURING ELECTRIC CONNECTERS

Jasper Hansen, Decatur, Ill., assignor to Faries Manufacturing Company, Decatur, Ill., a corporation of Illinois Application May 9, 1936, Serial No. 78,823

4 Claims. (Cl. 29—155.55)

My invention relates to that class of devices which are designed to clamp two wires together.

The principal object of my invention is to provide a method of construction which will have many less operations and is therefore, much simpler than the methods employed at the present time.

A further object is to avoid any drawing of the metal so as to maintain a better metal structure than can be secured where the grain structure is disturbed by the drawing operation.

My means of accomplishing the foregoing objects may be more readily understood by having reference to the accompanying drawings, which are hereunto annexed and are a part of this specification, in which Fig. 1 is a perspective view of the cutting and forming dies showing the material in place to be cut off and formed;

Fig. 2 is a vertical sectional view showing the material being formed after having been cut off;

Fig. 6 shows the completion of the intermediate operation;

Fig. 7 is an end view of the material after this operation;

Fig. 8 is a sectional view of the material in the dies for the finishing operation;

Fig. 9 shows an end view of the material as it is placed in the dies for the finishing operation;

Fig. 10 is a sectional view showing the finishing forming operation; and

Figure 3:
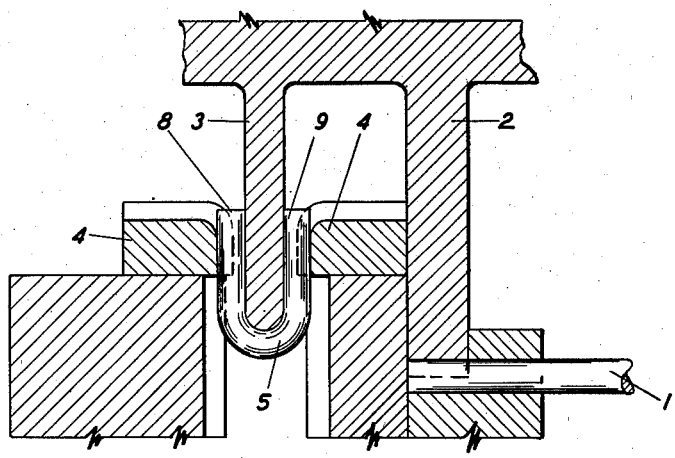
Fig. 3 is a similar view showing the connecter formed.
Figure 4:
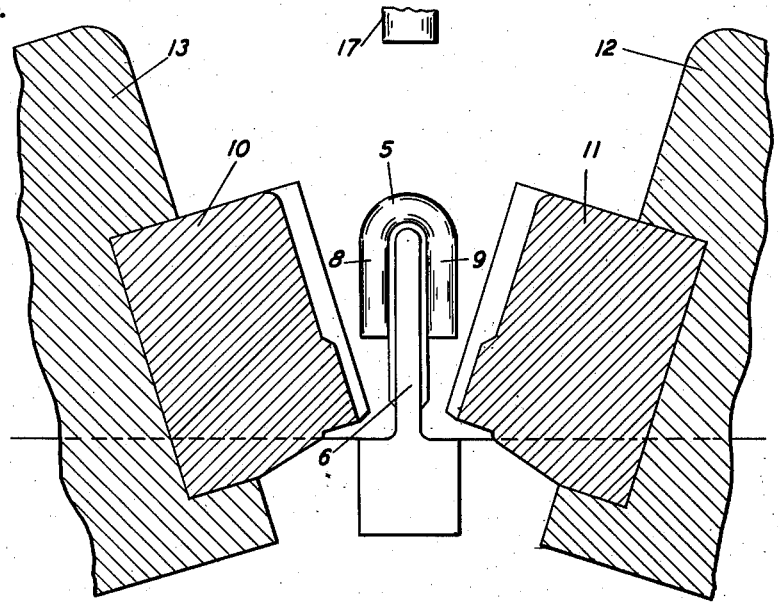
Fig. 4 is a sectional view showing the material at an intermediate stage of forming.
Figure 5:
Fig. 5 is an end view of the material before the intermediate operation.

Figs. 11, 12, and 13 are detail views of the finished connecter.

Similar reference numerals refer to similar parts throughout the entire description.

As shown in the drawings, a rod 1 of suitable material is fed into a press equipped with a cut off die 2 and forming die 3 which acts as a plunger for the female parts 4—4 of the die. As the parts of the die are reciprocated by the press the material is cut off and formed as seen in Fig. 2. The continued movement of the press completes the operation and the cut off portion of the rod 1 is bent or formed into the U-shaped member 5.

The U-shaped member 5 is then placed in a compression die and over a mandrel 6 designed to form a longitudinal groove 7—7 on the inner walls of the arms 8 and 9 of the U-shaped member. The compression die consists of two members 10 and 11 carried by pivoted arms 12 and 13 which are power operated. When they are swung into the position shown in Fig. 6 the grooves 7—7 will be formed as seen in Fig. 7.

The finishing die 14 is then placed in the arms 12 and 13 and the U-shaped member 5 is placed intermediate the two sections 14 of the finishing die. The mandrel 6 is kept in the grooves 7 to prevent their distortion during the finishing operation. The two sections 14 are provided with threaded grooves 15 to form threads on the finished connecter.

Sockets 16 to form a hexagonal head are provided, a plunger 17 being provided to prevent the material being extruded during the finishing operation. The head of the plunger abuts the end of the U-shaped member 5 as clearly seen in Fig. 10.

This produces a finished connecter ready for the reception of the wires between the arms 8 and 9. A nut (not shown) can be then screwed down until they are tightly held together.

Having described my invention, what I regard as new and desire to secure by Letters Patent is:

1. The method of forming an electric connecter which consists of bending a piece of a rod into a U-shaped member, forming grooves by compression on the inner faces of the arms of the U, then by compression forming threads on the outer surfaces of said arms and an angular head at the end of the U, the initial length of the rod being substantially retained throughout the method.

2. The method of forming an electric connecter which consists of bending a piece of a rod into a U-shaped member, forming grooves on the inner faces of the arms of the U, by compressing them over a mandrel, then by compression forming threads on the outer surfaces of said arms and an angular head at the end of the U, the initial length of the rod being substantially retained throughout the method.

3. The method of forming an electric connecter which consists of bending a piece of a rod into a U-shaped member, then by compression forming grooves on the inner faces of the arms of the U, then by compression forming threads on the outer surfaces of said arms and an angular head at the end of the U, while retaining the mandrel in said grooves, the initial length of the rod being substantially retained throughout the method.

4. The method of forming an electric connecter which consists of cutting off a piece of rod and forming it into a U-shaped member in a single operation, then by compression forming grooves on the inner faces of the arms of the U, then by compression forming threads on the outer surfaces of said arms and an angular head at the end of the U, the initial length of the rod being substantially retained throughout the method.

JASPER HANSEN.